United States Patent [19]

Tanaka et al.

[11] 4,203,296
[45] May 20, 1980

[54] SUPERCHARGED INTERNAL COMBUSTION ENGINE

[75] Inventors: Eizi Tanaka, Anjo; Akira Nishimatsu, Okazaki; Michiniro Ohashi, Handa, all of Japan

[73] Assignee: Nippon Soken, Inc., Nishio, Japan

[21] Appl. No.: 907,859

[22] Filed: May 19, 1978

[30] Foreign Application Priority Data

May 23, 1977 [JP] Japan .................................. 52/60314
Jun. 27, 1977 [JP] Japan .................................. 52/76776

[51] Int. Cl.$^2$ ............................................. F02B 37/00
[52] U.S. Cl. ...................................................... 60/602
[58] Field of Search ................. 60/600, 601, 602, 603, 60/614

[56] References Cited

U.S. PATENT DOCUMENTS

| | | | |
|---|---|---|---|
| 2,306,277 | 12/1942 | Oswald | 60/602 |
| 3,195,805 | 7/1965 | Cholrin et al. | 60/602 X |
| 4,075,849 | 2/1978 | Richardson | 60/602 |

FOREIGN PATENT DOCUMENTS

| | | | |
|---|---|---|---|
| 50-65712 | 6/1975 | Japan | 60/602 |
| 530762 | 12/1940 | United Kingdom | 60/602 |

*Primary Examiner*—Michael Koczo
*Attorney, Agent, or Firm*—Cushman, Darby & Cushman

[57] ABSTRACT

A supercharged internal combustion engine has a turbo supercharger mounted on an exhaust pipe so that a turbine of the supercharger is driven by engine exhaust gases to drive a blower for the compression of engine intake air. A bypass exhaust pipe is connected to the exhaust pipe at a point upstream of the supercharger and extends in bypassing relationship to the supercharger. A valve is provided in the exhaust system at the above-mentioned point to control the exhaust gas flow into and through the exhaust pipe and the bypass exhaust pipe, respectively. A valve actuator is responsive to variation in the intake pressure in the engine intake system downstream of a throttle valve to actuate the valve such that, when the intake pressure is not greater than a first predetermined value, the valve is actuated to fully close the exhaust pipe and, when the intake pressure becomes greater than a second predetermined value, the valve is actuated to fully close the bypass pipe, whereby the supercharger is operated only in a throttle full-open engine operating range and the supercharging air pressure is kept below a predetermined pressure level to prevent not only the supercharger but also the engine intake and exhaust systems from being continuously subjected to loads.

5 Claims, 6 Drawing Figures

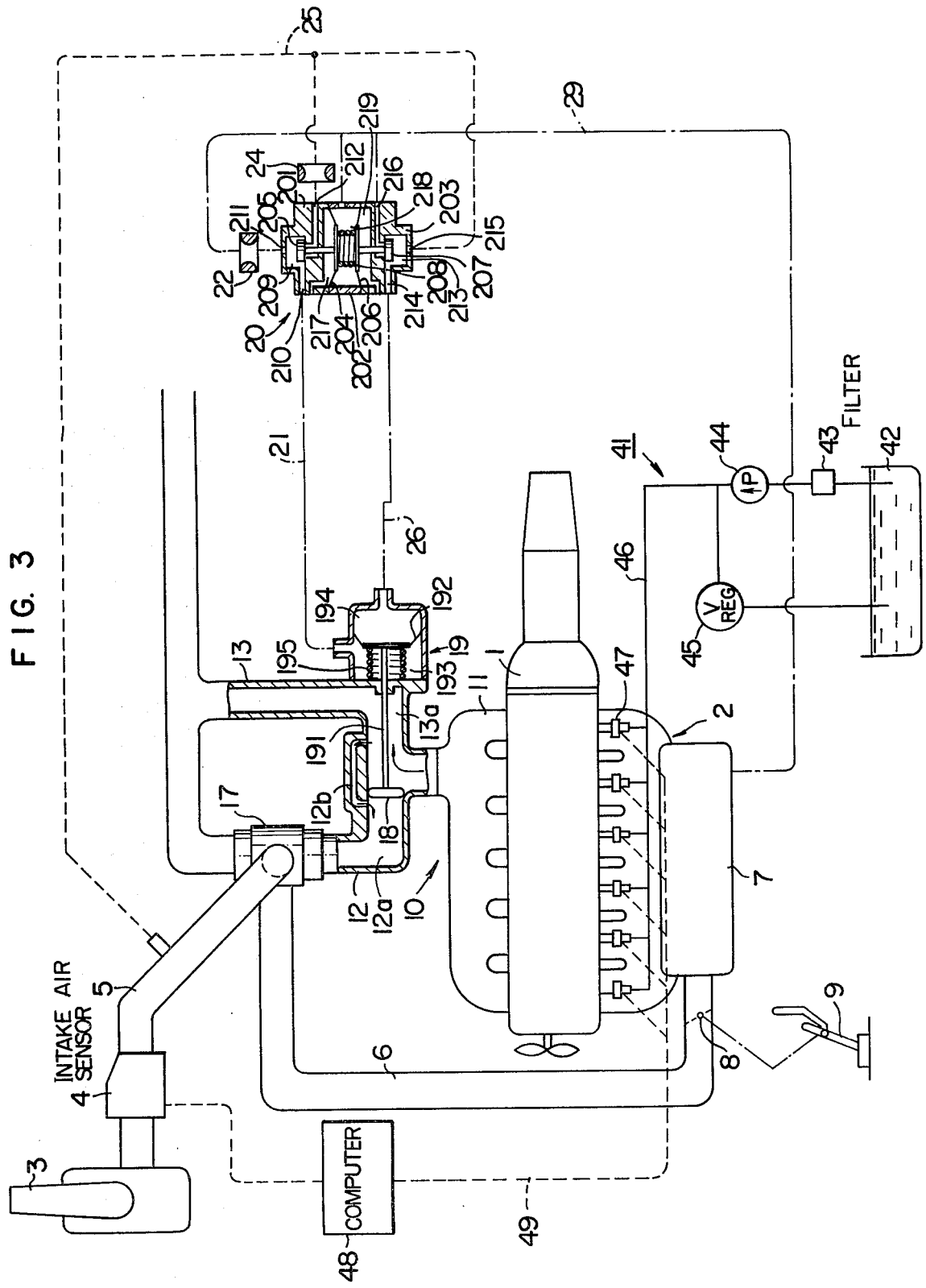

SUPERCHARGED INTERNAL COMBUSTION ENGINE

BACKGROUND OF THE INVENTION

1. Field of the Invention

The present invention relates to a supercharged internal combustion engine with a supercharger controlled in accordance with the condition of operation of the engine.

2. Description of the Prior Art

Various types of superchargers including mechanically-driven superchargers and turbo superchargers have been known. These conventional superchargers are operative in both throttle part-open and full-open engine operating ranges so as to attain an increased engine output in the throttle full-open engine operating range. An exhaust or intake bypass passage is employed to avoid supercharging at an unduly high pressure.

However, it is not good policy to operate the supercharger over the entire engine operation ranges. Namely, in case of a turbo supercharging system, the flow of pressurized air discharged from the supercharger is restricted or throttled by the throttle valve of the engine during the throttle part-open engine operation to render the operation of the supercharger meaningless. At the same time, the exhaust pressure of the engine is increased, as the exhaust gases are forced to pass through and drive the supercharger, so that the intake efficiency of the engine is considerably lowered to decrease the engine output. Further, the supercharging over the entire engine operation ranges subjects the supercharger itself and the intake and exhaust systems to continuous load. This is quite inconvenient from the view point of the durability of the supercharger and the intake and exhaust systems.

SUMMARY OF THE INVENTION

It is therefore a major object of the invention to overcome above-described problems of the prior art by providing an improved supercharged engine in which a supercharger is operated only in a throttle full-open engine operating range including an abrupt acceleration operation and in which the supercharging air pressure is always kept below a preset pressure.

According to the invention, there is provided a supercharged internal combustion engine comprising: an intake system including an intake duct for feeding air into engine cylinders; a throttle valve pivotally mounted in the intake duct to control the rate of air flow therethrough; an exhaust system for discharging engine exhaust gases into the atmosphere; the exhaust system including an exhaust pipe; a supercharger mounted on the exhaust pipe and driven by the flow of the engine exhaust gases therethrough to produce and feed pressurized air into the engine cylinders; the exhaust system further including a bypass exhaust pipe bypassing the supercharger and having an upstream end connected to the exhaust pipe at a point upstream of the supercharger; means disposed in the exhaust system adjacent to said point and being operative to open and close the exhaust pipe and the bypass exhaust pipe for thereby controlling the flow of engine exhaust gases into and through the exhaust pipe and the bypass exhaust pipe; and control means operatively associated with the exhaust gas flow controlling means and being responsive to variation in the intake pressure in the intake system downstream of the throttle valve to actuate the exhaust gas flow controlling means; said control means being operative such that, when the intake pressure is not greater than a first predetermined value, the exhaust gas flow controlling means is actuated to fully close the exhaust pipe and, when the intake pressure becomes greater than a second predetermined value, said exhaust gas flow controlling means is actuated to fully close the bypass exhaust pipe.

The above and other objects, features and advantages of the invention will become more clear from the following description in conjunction with the accompanying drawings.

BRIEF DESCRIPTION OF THE DRAWINGS

FIG. 3 is a partly diagrammatic and partly sectional illustration of a second embodiment of the invention;

DESCRIPTION OF PREFERRED EMBODIMENTS

Figure 1:
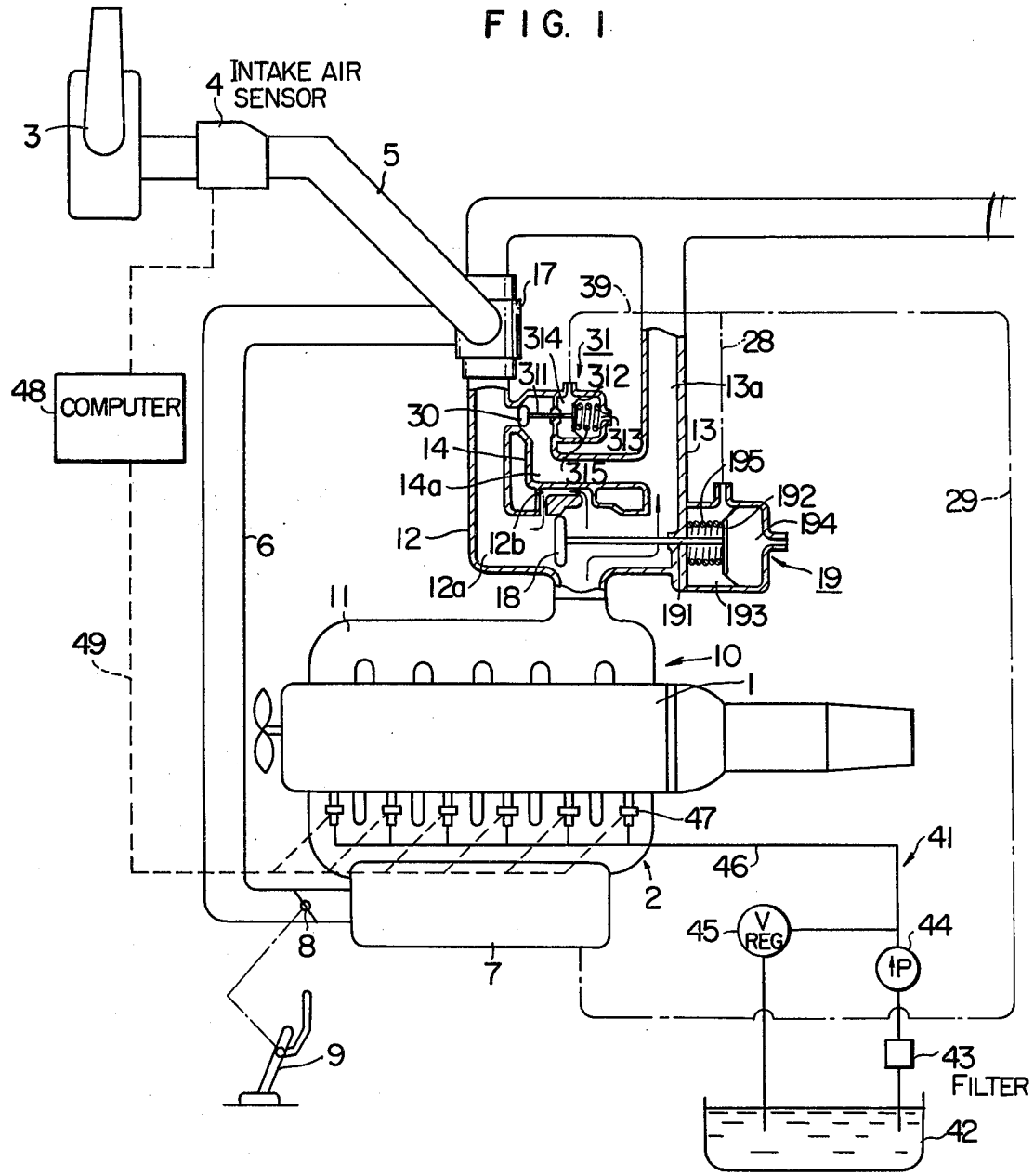
FIG. 1 is a partly diagrammatic and partly sectional illustration of a first embodiment of the invention.

Referring first to FIG. 1, a supercharged internal combustion engine 1 embodying the present invention is shown as having an intake system 2. The intake system 2 has an air cleaner 3, an air sensor 4 which is in communication with the air cleaner 3 and adapted to detect and meter the intake air flow, intake ducts 5, 6 and an intake manifold 7. A throttle valve 8 is disposed in the intake duct 6 and operatively connected to an accelerator pedal 9 to control the passage of air through the intake duct 6.

The engine 1 has an exhaust system 10 which includes an exhaust manifold 11, an exhaust pipe 12 connected to the exhaust manifold 11, a bypass exhaust pipe 13 extending in parallel with the exhaust pipe 12 and an exhaust gas release pipe 14 through which the exhaust pipe 12 and the bypass exhaust pipe 13 communicate each other.

Reference numeral 17 denotes a turbo supercharger of known type having a gas turbine adapted to be driven by the energy possessed by the exhaust gases flowing through the exhaust passage 12. The supercharger 17 has an intake air inlet communicating with the intake duct 5 and an air outlet to which the intake duct 6 is connected. The supercharger further has an exhaust gas inlet and outlet suitably disposed in the exhaust pipe 12.

A first valve member 18 is adapted to be actuated by a first valve actuator 19 to selectively open and close an exhaust passage 12a in the exhaust pipe 12 and a bypass exhaust passage 13a in the bypass exhaust pipe 13. The first valve actuator 19 includes a valve rod 191 to one end of which the valve member 18 is secured, a diaphragm 192 connected to the other end of the valve rod 191, first and second chambers 193 and 194 separated from each other by the diaphragm 192, and a spring 195 disposed in the first chamber 193 and adapted to bias the valve member 18 in a direction to open the exhaust passage 12a. The first chamber 193 is communicated with the intake manifold 7 through pressure transmitting passages 28 and 29 while the second chamber 194 is vented to the atmosphere.

A second valve member 30 is adapted to be actuated by a second valve actuator 31 to open and close an exhaust gas release passage 14a in the exhaust gas release pipe 14. The second valve actuator 31 has a valve rod 311 secured at its one end to the valve member 30, a diaphragm 312 connected to the other end of the valve rod 311, first and second chambers 313 and 314 separated from each other by the diaphragm 312, and a spring 315 disposed in the first chamber 313 and adapted to bias the valve member 30 in a direction to close the exhaust gas release passage 14a. The first chamber 313 is kept in communication with the atmosphere, while the second chamber 314 communicates with the intake manifold 7 through pressure transmitting passages 39 and 29.

The exhaust pipe 12 further has a bypass passage 12b adapted to allow a part of the exhaust gases to flow into the exhaust passage 12a when the first valve member 18 is in its fully closed position.

A fuel circuit generally designated by numeral 41 comprises a fuel tank 42, a fuel filter 43, a fuel pump 44, a fuel pressure regulator 45, a fuel conduit 46, fuel injectors 47, a computer 48 and an electric wiring 49.

In operation, the intake air flow rate is determined by the opening degree of the throttle valve 8. The intake air flow is sensed and metered by the air sensor 4. A signal representative of the intake air flow rate is transmitted from the air sensor 4 to the computer 48 to enable the latter to determine the optimum amount of fuel to be injected into the engine 1. Consequently, the fuel is injected by the fuel injectors 47.

The fuel is continuously pumped up by the fuel pump 44 through the fuel filter 43 from the fuel tank 42 and supplied to the fuel injectors 47 through the fuel conduit 46 at a pressure regulated by the fuel pressure regulator 45.

At a throttle part-open engine operating condition, the flow of intake air is restricted or throttled by the throttle valve 8, so that a vacuum is produced in the intake manifold 7. The vacuum is transmitted through the pressure transmitting passages 29 and 28 to the first chamber 193 of the first valve actuator 19, so that the first valve member 18 is moved leftward as shown in FIG. 1 against the force of the spring 195 to close the exhaust passage 12a. At the same time, the vacuum is transmitted also to the second chamber 314 of the second valve actuator 31 through the pressure transmitting passages 29 and 39, so that the second valve member 30 is moved by the force of the vacuum and the spring 315 to the left as viewed in FIG. 1 to close the exhaust gas release passage 14a. Consequently, the exhaust gases from the engine 1 are discharged into the atmosphere through the bypass exhaust passage 13a. At this time, a part of the exhaust gases from the engine is allowed to flow into the exhaust passage 12a through the bypass passage 12b to drive the turbine of the supercharger at a low speed thereby to avoid sticking of the turbine rotor shaft and eliminate time lag of response of the supercharger operation to an abrupt acceleration of the engine operation. The force of the spring 195 and the effective pressure-receiving area of the diaphragm 192 are so selected that the described low-speed operation of the supercharger is maintained when the intake pressure downstream of the throttle valve 8 is less than a predetermined pressure, for example, −80 mmHg. As the intake pressure is increased up to −80 mmHg, the first valve member 18 is gradually moved away from the exhaust passage 12a to open the latter. Further increase of the intake pressure forces the first valve member 18 toward the bypass exhaust passage 13a to decrease the opening degree of the latter. The exhaust bypass passage 13a is completely closed by the first valve member 18 when the intake pressure is increased up to a second predetermined pressure, for example, −20 mmHg.

Thus, in the throttle full-open engine operating condition including quick acceleration of the engine, a low vacuum or a positive pressure is applied to the first chamber 193 of the first valve actuator so that the first valve member 18 is moved to fully close the bypass exhaust passage 13a in the case where the supercharging pressure falls to a low pressure range of, for example, between −20 mmHg and +180 mmHg. The low vacuum or the positive pressure is also introduced into the second chamber 314 of the second valve actuator 31. However, this supercharging pressure not exceeding +180 mmHg is still too low to overcome the force of spring 315, so that the second valve member 30 keeps the exhaust gas release passage 14a closed. Therefore, the exhaust gases discharged from the engine are all caused to flow through the exhaust passage 12a and drive the turbine of the supercharger 17. Consequently, a blower mounted on same rotor shaft as that of the turbine is driven to effectively produce pressurized supercharging intake air. Thus, the supercharger 17 makes an efficient use of the energy possessed by the exhaust gases to produce the pressurized supercharging intake air. The pressurized supercharging intake air is then introduced into the engine 1 thereby to contribute to an increase of the engine output.

When the supercharging intake air pressure has come to exceed a predetermined level (+180 mmHg or higher, for example) during the throttle full-open engine operation, the pressure in the second chamber 314 of the second valve actuator 31 is correspondingly increased up to, for example, +180 mmHg or higher, so that the force of the spring 315 is overcome to allow the second valve member 30 to open the exhaust release passage 14, whereas the first valve member 18 keeps the exhaust passage 12a opened. Consequently, a part of the exhaust gases is released from the exhaust passage 12a into the exhaust gas bypass passage 13a for thereby reducing the energy of the exhaust gases exerted to the supercharger 17.

The supercharging effect of the blower is decreased accordingly to lower the supercharging pressure applied to the engine 1. When the supercharging pressure is lowered excessively, the second valve member 30 is moved to close the exhaust release passage 14 again. It will be seen that the supercharging pressure is maintained within a predetermined range due to the repeated operation of the second valve member 30 and, therefore, is prevented from becoming excessively high.

The aforementioned pressure levels at which the switching of valve operations takes place are mere examples and the essence of the invention resides in that the switching of the valve operation is effected in accordance with the change of operating conditions of the engine.

Figure 2:
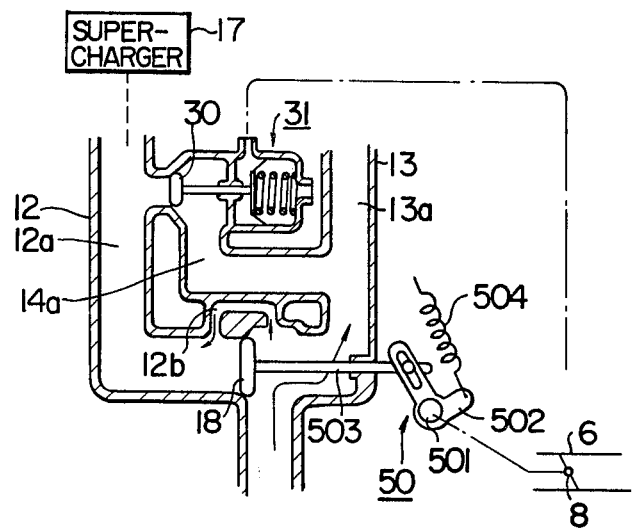
FIG. 2 illustrates a modification of the first embodiment shown in FIG. 1.

Referring now to FIG. 2 showing a modification of the first embodiment shown in FIG. 1, a first valve actuator 50 corresponding to the valve actuator 19 of the first embodiment includes a shaft 501 operatively connected to the throttle valve 8, a rotary member 502 adapted to be rotated with the shaft 501, a valve rod 508 adapted to transmit the movement of the rotary member 502 to the first valve member 18 and a return spring 504.

In operation, the first valve member 18 is held at a position shown in FIG. 2 when the throttle valve 8 is opened only partially, e.g. to an opening degree of 4/5 or smaller. Therefore, the most part of the exhaust gases flows through the bypass exhaust passage 13a, while a small part of the exhaust gases is allowed to flow into the exhaust passage 12a through the bypass passage 12b.

When the throttle valve 8 is opened substantially to full open position, e.g. to an opening degree exceeding 4/5 opening, the shaft 501 and the rotary member 502 are rotated clockwise against the force of the return spring 504 to move the first valve member 18 away from the exhaust passage 12a. Consequently, whole part of the exhaust gases is caused to flow through the exhaust passage 12a, so that the supercharger 17 operates to pressurize the intake air to increase the engine output. When the intake pressure is increased to exceed a predetermined pressure, e.g. +180 mmHg, the second valve member 30 opens the exhaust gas release passage 14a, as in the first embodiment, so that the supercharging pressure is maintained within a predetermined range to ensure an advantageous effect similar to that provided by the first embodiment.

In the foregoing embodiment and the modification, the first valve actuators 19 and 50 are operated by the intake pressure of the engine and the throttle valve 8, respectively. However, any other actuator may be employed so long as the actuator employed is responsive to changes in the engine operating conditions.

As having been described, the first embodiment of the invention, including the described modification thereof, is arranged such that, in a throttle part-open engine operating condition, the exhaust gas passage is closed while the bypass exhaust gas passage is opened so that only a minimum required exhaust gas flows to the supercharger 17. Consequently, an undesirable pressure rise in the exhaust system of the engine is avoided to prevent decrease in the intake efficiency. Therefore, no substantial reduction of intake air flow rate takes place, so that the reduction of engine output which would otherwise occur due to the provision of the supercharger is advantageously avoided. In addition, the bypassing of the exhaust gases assures improvements in the durability of the supercharger itself, intake system and the exhaust system because they are prevented from being continuously subjected to loads.

In the throttle full-open engine operating range including the quick acceleration, the bypass exhaust passage is closed to allow the whole part of the exhaust gases to flow into the gas turbine of the supercharger to enable the latter to efficiently produce an increased supercharging air pressure when the supercharging air pressure is still low.

Moreover, when the supercharging air pressure is increased to exceed a predetermined level in the throttle full-open engine operating range, the exhaust gas release passage is opened to maintain the supercharging intake air pressure within a predetermined range to thereby protect the supercharger, engine itself, exhaust system and even the intake system against a breakage and to present undesirable engine knocking which would otherwise be caused by an excessive supercharging.

Figure 4:
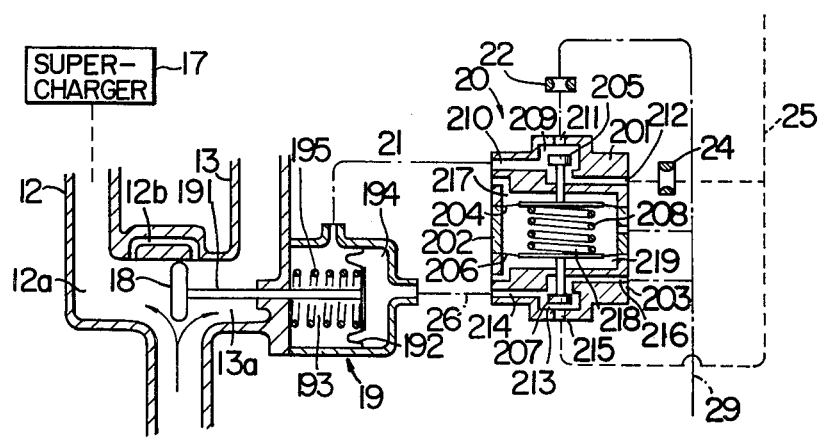
FIG. 4 is a sectional view of a valve actuator and a pressure controller shown in FIG. 3 with the parts being shown in working positions different from those shown in FIG. 3.
Figure 5:
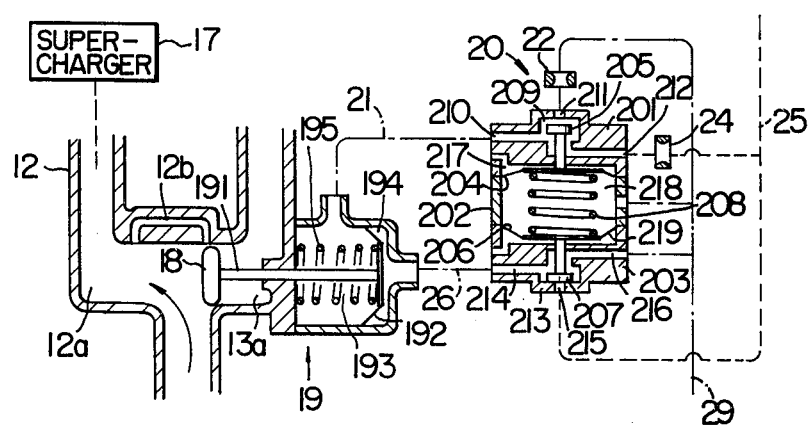
FIG. 5 shows the valve actuator and pressure controller in further different working positions.

FIGS. 3 to 5 inclusive show a second embodiment of the invention. The parts similar to those of the first embodiment are designated by similar reference numerals. The second embodiment differs from the first embodiment in that it does not include the exhaust gas release passage 14, second valve member 30 and the second valve actuator 31.

A pressure controller 20 is adapted to control the supply of pneumatic pressures to first and the second chambers 193 and 194 of a valve actuator 19. This controller 20 includes first to third casing members 201, 202 and 203, a first diaphragm 204 having a peripheral edge portion sandwitched between the first casing member 201 and the second casing member 202, a first valve member 205 adapted to be driven by the first diaphragm 204, a second diaphragm 206 having a peripheral edge sandwitched between the second and third casing members 202 and 203, a second valve member 207 adapted to be driven by the second diaphragm 206, and a spring 208 disposed between the first and second diaphragms 204 and 206.

A passage 209 is formed in the first casing member 201. The passage 209 has first to third ports 210, 211 and 212. The first port 210 is in communication with the first chamber 193 of the valve actuator 19 through a first pressure-transmitting passage 21, while the second port 211 communicates with the intake manifold 7 through a first orifice or restriction 22 and a second pressure-transmitting passage 29. The third port 212 communicates with the intake duct 5 through a second orifice or restriction 24 and a third pressure-transmitting passage 25. The second and third ports 211 and 212 are adapted to be selectively opened and closed by the first valve member 205.

Similarly, the third casing member 203 is provided with a passage 213 formed therein. This passage 213 has fourth to sixth ports 214, 215 and 216. The fourth port 214 is in communication with the second chamber 194 of the valve actuator 19 through a fourth pressure-transmitting passage 26, while the fifth port 215 is connected to the third pressure-transmitting passage 25. The sixth port 216 is connected through the second pressure-transmitting passage 29 to the intake manifold 7. The fifth and the sixth ports 215 and 216 are adapted to be selectively opened and closed by the second valve member 207.

The first casing member 201 and the first diaphragm 204 cooperate to define a first diaphragm chamber 217 which is vented to the atmosphere, while a second diaphragm chamber 218 is defined by two diaphragms 204 and 206 and the second casing member 202 and communicated with the intake manifold 7 through the second pressure-transmitting passage 29. A third diaphragm chamber 219 is formed between the third casing member 203 and the second diaphragm 206 and vented to the atmosphere.

In operation, when the engine 1 is started, intake air is induced into the engine 1 at a rate which is determined by the opening degree of the throttle valve 8. The intake air flow rate is detected by the air sensor 4. The air sensor 4 emits a signal representative of the intake air flow rate to the computer 48 which determines the optimum rate of fuel injection in relation with the intake air flow rate. Consequently, the fuel is injected into the engine 1 at the optimized rate through fuel injectors 47. The fuel is continuously pumped up by the fuel pump 44 from the fuel tank 42 through the fuel filter 43 and is delivered through the fuel conduit 46 to the fuel injectors 47 at a pressure regulated by the fuel pressure regulator 45.

During a throttle part-open engine operation, the induced intake air is throttled by the throttle valve 8, so that a vacuum is produced in the intake manifold 7. This vacuum is introduced into the second diaphragm chamber 218 of the pressure controller 20 through the second pressure-transmitting passage 29. As a result, two diaphragms 204 and 206 are deflected toward each other as shown in FIG. 3. Consequently, the first valve member 205 is moved to close the third port 212 and open the port 211, while the second valve member 207 is moved to close the sixth port 216 and open the fifth port 215. In this condition, the pressure in the intake manifold 7 (this pressure will be called "intake pressure" hereunder) is transmitted to the first chamber 193 of the valve actuator 19 through the first restriction 22, second port 211, first port 210 and the first pressure-transmitting passage 21, whereas the pressure in the intake duct 5 is transmitted to the second chamber 194 of the valve actuator 19 through the third pressure transmitting passage 25, the fifth port 215, the fourth port 214 and the fourth pressure-transmitting passage 26.

It should be noted that, when the engine is operated with its throttle valve partially opened, the intake pressure is a sufficiently large vacuum, while the pressure in the intake duct 5 is a minimum vacuum substantially equal to the atmospheric pressure. Therefore, the diaphragm 192 of the valve actuator 19 is deflected to the left as shown in FIG. 3, so that the valve member 18 is moved to close the exhaust passage 12a. Consequently, substantially all of the exhaust gases discharged from the engine 1 is released to the atmosphere through the bypass exhaust passage 13a, but a small part of the exhaust gases is introduced into the exhaust passage 12a through the bypass passage 12b so as to drive the turbine of the supercharger 17 at a minimum required speed thereby to prevent sticking of the turbine rotor shaft as well as to prevent time lag of response of the turbine operation to a quick-acceleration of the engine. In this condition of the supercharger, supercharging is performed little, and thus pressure rise in the exhaust system of the engine takes place little. This condition is maintained as long as the pressure in the second diaphragm chamber 218 of the valve controller 20 (i.e. the intake pressure) is lower than a predetermined low pressure level of, for example, −80 mmHg.

In the engine transition operating range in which the throttle valve position is changed from part-open position to full-open position, and in which the intake pressure is varied from, for example, −80 mmHg to −30 mmHg, the intake pressure introduced into the second diaphragm chamber 218 of the pressure controller 20 becomes close to the atmospheric pressure, so that the two diaphragms 204 and 206 are forced away from each other by the spring 208 to the positions shown in FIG. 4. Consequently, the first valve member 205 causes the second and third ports 211 and 212 to be both open, while the second valve member 207 also causes the fifth and sixth ports 215 and 216 to be both open. Therefore, the first chamber 193 of the valve actuator 19 is brought into communication with the intake manifold 7 and the intake duct 5 through the restrictions 22 and 24, so that the first chamber 193 is subjected to a vacuum smaller than the intake pressure which is lower than the atmospheric pressure at this moment. On the other hand, since the second chamber 194 of the valve actuator 19 is allowed to communicate with both of the intake duct 5 and the intake manifold 7, the pressure in the chamber 194 is increased substantially to the level of the atmospheric pressure. The diaphragm 192 of the valve actuator 19 is therefore deflected to a position where the force caused by the small vacuum in the first chamber 193 and the force of the spring 195 balance with each other, to cause the valve member 18 to open both of the exhaust passage 12a and the bypass exhaust passage 13a. Consequently, the supercharger 17 starts operation to increase the supercharging pressure in accordance with the increase of the exhaust gas flow rate through the exhaust passage 12a.

In the throttle full-open engine operating range, supposing that the supercharging pressure is as low as, for example, −30 mmHg to +180 mmHg, two diaphragms 204 and 206 of the pressure controller 20 are biased by the force of the spring 208 to positions in which the first valve member 205 keeps the second and third ports 211 and 212 opened, while the second valve member 207 closes the fifth port 215. Therefore, the first chamber 193 of the actuator 19 is subjected through the restrictions 22 and 24 to a pressure of a level which is intermediate between the intake pressure and the pressure in the intake duct 5. It will be understood by those skilled in the art that the supercharging pressure is equal to the intake pressure when the throttle valve 8 is fully opened. On the other hand, the second chamber 194 is subjected to the intake pressure. Thus, when the intake pressure is lower than the atmospheric pressure (i.e., vacuum), the pressure in the second chamber 194 is lower than that in the first chamber 193. Therefore, the diaphragm 192 is deflected to the right, as shown in FIG. 5, by the combined force of the force produced by the pressure differential and the force of the spring 195. When the intake pressure is a positive pressure, the pressure in the second chamber 194 is higher than that in the first chamber 193. However, the pressure differential is not so larger as to overcome the force of the spring 195, so that the diaphragm 192 is deflected also to the right, as shown in FIg. 5. Consequently, the valve member 18 causes the bypass exhaust passage to be fully closed so that the whole parts of the exhaust gases are cuased to flow into the exhaust passage 12a. The gas turbine of the supercharger 17, therefore, is rotated in its full-powr operation to drive the blower so that the blower pressurizes or compresses the intake air induced through the intake duct 5 so as to supply the engine 1 with the compressed supercharging air through the intake manifold 7.

When the supercharging pressure is increased to exceed a predetermined high pressure, e.g. +180 mmHg or higher, during the throttle full-open engine operation, the pressure differential between the first chamber 193 and the second chamber 194 in the valve actuator 19 becomes larger enough to deflect the diaphragm 192 leftward from the position shown in FIG. 5, although the condition of the pressure controller 20 is not changed. Thus, the valve member 18 is moved between the exhaust passage 12a and the bypass exhaust passage 13a in response to the change of the supercharging pressure so as to maintain the supercharging pressure at a substantially constant level, for example, +180 mmHg, which does not exceed the predetermined high pressure.

Figure 6:
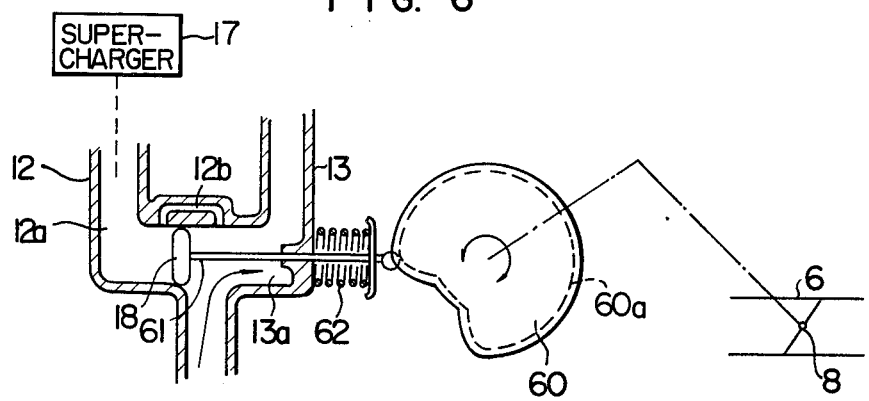
FIG. 6 is an illustration of a modification of the second embodiment shown in FIG. 3.

FIG. 6 shows a modification of the second embodiment, in which the combination of the pressure controller 20 and the valve actuator 19 for controlling the operation of the valve member 18 is substituted by a cam 60 operatively connected to the throttle valve 8. A valve rod 61 is connected at one end to the valve member 18 and is forced by a spring 62 into contact at the other end with the bottom surface of a cam groove 60a formed in the peripheral surface of the cam 60. The arrangement is such that the valve rod 61 is moved in accordance with the rotation of the cam 60 to change the position of the valve member 18 in response to the change of the opening degree of the throttle valve 8. The cam 60 is adapted to be rotated clockwise as the degree of the opening of the throttle valve 8 is increased. The exhaust passage 12a is fully closed by the valve member 18 when the throttle valve 8 is fully closed or partially opened. As the throttle valve 8 is opened to a larger opening degree, e.g. to 4/5 opening degree, the valve member 18 closes the bypass exhaust passage 12a and opens the exhaust passage 12a. This condition is maintained over a predetermined range of opening degree of the throttle valve 8. When the throttle valve 8 is opened to a still larger opening degree, the valve member 18 begins to open the bypass exhaust passage 13a so as to release a part of the exhaust gases thereby to prevent an excessive rise of the supercharging pressure.

It will be seen that the second embodiment and the modification thereof function substantially in the same manner as the first embodiment and provides advantageous effects similar to those of the latter.

What is claimed is:

1. A supercharged internal combustion engine comprising:
   an intake system including an intake duct for feeding air into engine cylinders;
   a throttle valve pivotally mounted in said intake duct to control the rate of air flow therethrough;
   an exhaust system for discharging engine exhaust gases into the atmosphere;
   said exhaust system including an exhaust pipe;
   a supercharger mounted on said exhaust pipe and driven by the flow of the engine exhaust gases therethrough to produce and feed pressurized air into the engine cylinders;
   said exhaust system further including a bypass exhaust pipe bypassing said supercharger and having an upstream end connected to said exhaust pipe at a point upstream of said supercharger;
   means disposed in said exhaust system adjacent to said point and being operative to open and close said exhaust pipe and said bypass exhaust pipe for thereby controlling the flow of engine exhaust gases into sand through said exhaust pipe and said bypass exhaust pipe; and
   control means operatively associated with said exhaust gas flow controlling means and being responsive to variation in the intake pressure in said intake system downstream of said throttle valve to actuate said exhaust gas flow controlling means;
   said control means being operative such that, when the intake pressure is not greater than a first predetermined value, said exhaust gas flow controlling means is actuated to fully close said exhaust pipe and, when said intake pressure becomes greater than a second predetermined value, said exhaust gas flow controlling means is actuated to fully close said bypass exhaust pipe.

2. A supercharged internal combustion engine according to claim 1, wherein said exhaust system further includes a bypass passage bypassing said exhaust gas flow controlling means and having a downstream end connected to said exhaust pipe upstream of said supercharger to allow a part of the engine exhaust gases to bypass said exhaust gas flow control means into said exhaust pipe when said exhaust pipe is fully closed by said exhaust gas flow controlling means.

3. A supercharged internal combustion engine according to claim 1 or 2, wherein said exhaust system further includes:
   an exhaust gas release passage extending between said bypass exhaust pipe downstream of said exhaust gas flow controlling means and said exhaust pipe between said exhaust gas flow controlling means and said supercharger;
   a valve means disposed in said exhaust gas release passage to control the flow of engine exhaust gases therethrough;
   a valve actuator operatively associated with said valve means and being responsive to variation in the intake pressure in said intake system downstream of said throttle valve to actuate said valve means such that, when said intake pressure becomes greater than a third predetermined value greater than said second predetermined pressure value, said valve means opens said exhaust gas release passage whereby a part of the engine exhaust gases flowing through said exhaust pipe between said exhaust gas flow controlling means and said supercharger is allowed to flow from said exhaust pipe through exhaust gas release passage into said bypass exhaust pipe to decrease the rate of exhaust gas flow to and through said supercharger.

4. A supercharged internal combustion engine according to claim 1 or 2, wherein said control means is operative to actuate said exhaust gas flow controlling means such that, when said intake pressure becomes greater than a third predetermined value greater than said second predetermined pressure value, said exhaust gas flow controlling means again opens said bypass exhaust pipe whereby a part of the engine exhaust gases flows into and through said bypass exhaust pipe to reduce the rate of exhaust gas flow to and through said supercharger.

5. A supercharged internal combustion engine according to claim 4, wherein said exhaust gas flow controlling means include:
   a valve member disposed in said exhaust pipe adjacent to said point and being operative to open and close said exhaust pipe and said bypass exhaust pipe and to control the exhaust gas flow sectional areas thereof; and
   a valve actuator comprising a diaphragm, first and second pressure chambers separated by said diaphragm, a valve rod connecting said diaphragm to said valve member and a spring resiliently biasing said diaphragm in a direction to cause said valve member to close said bypass exhaust pipe; and
   wherein said control means include;
   a casing comprising first, second and third casing members;
   a first diaphragm having peripheral edge portion sandwiched between said first and second casing members;
   a second diaphragm having a peripheral edge portion sandwiched between said second and third casing members;

a first diaphragm chamber defined by the cooperation of said first casing member and said first diaphragm and vented to the atmosphere;

a second diaphragm chamber defined by the cooperation of said first and second diaphragms and said second casing member and communicated with said intake duct downstream of said throttle valve;

a third diaphragm chamber defined by the cooperation of said second diaphragm and said third casing member and vented to the atmosphere;

said first casing member defining therein a first passage and first, second and third ports all connected to said first passage, said first, second and third ports being communicated with said first pressure chamber in said valve actuator, communicated with said intake duct downstream of said throttle valve and vented to the atmosphere, respectively;

a first valve member disposed in said first passage and operatively connected to said first diaphragm to control the communication between said first, second and third ports;

said third casing member defining therein a second passage and fourth, fifth and sixth ports connected to said second passage, said fourth, fifth and sixth ports being communicated with said second pressure chamber in said valve actuator, vented to the atmosphere and communicated with said intake duct downstream of said throttle valve, respectively;

a second valve member disposed in said second passage and operatively connected to said second diaphragm to control the communication between said fourth, fifth and sixth ports; and a spring disposed in said second diaphragm chamber to resiliently bias said first and second diaphragms toward said first and third casing members, respectively.

* * * * *